US012184761B2

(12) United States Patent
Borja Jaramillo et al.

(10) Patent No.: US 12,184,761 B2
(45) Date of Patent: Dec. 31, 2024

(54) PROOF OF POSSESSION OF PRIVATE KEYS FOR REMOTE DEVICES

(71) Applicant: Microsoft Technology Licensing, LLC, Redmond, WA (US)

(72) Inventors: Andres Felipe Borja Jaramillo, Shoreline, WA (US); Jeremy Joseph Corley, Clyde Hill, WA (US); Tolga Acar, Sammamish, WA (US); Prashant Dewan, Portland, OR (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 17/847,024

(22) Filed: Jun. 22, 2022

(65) Prior Publication Data

US 2023/0421361 A1 Dec. 28, 2023

(51) Int. Cl.
*H04L 9/08* (2006.01)
*H04L 9/32* (2006.01)

(52) U.S. Cl.
CPC .......... *H04L 9/0825* (2013.01); *H04L 9/0866* (2013.01); *H04L 9/3247* (2013.01); *H04L 9/3271* (2013.01)

(58) Field of Classification Search
CPC ... H04L 9/0825; H04L 9/0866; H04L 9/3247; H04L 9/3271; H04L 9/0877; H04L 9/3297; H04L 63/0407; H04L 63/12; G06Q 20/38215
See application file for complete search history.

(56) References Cited

U.S. PATENT DOCUMENTS

| 5,878,142 A | * | 3/1999 | Caputo ................... H04L 63/12 713/192 |
| 6,047,242 A | * | 4/2000 | Benson ................. H04L 9/3271 705/76 |
| 9,141,769 B1 | * | 9/2015 | Hitchcock ............. H04L 9/0877 |
| 2012/0173873 A1 | | 7/2012 | Bell et al. |
| 2019/0356529 A1 | | 11/2019 | Gulati |

(Continued)

FOREIGN PATENT DOCUMENTS

WO 2022006736 A1 1/2022

OTHER PUBLICATIONS

"Azure IoT Hub Device Provisioning Service (DPS) Documentation", Retrieved from: https://docs.microsoft.com/en-us/azure/iot-dps/, Retrieved Date: May 16, 2022, 346 Pages.

(Continued)

*Primary Examiner* — Le H Luu
(74) *Attorney, Agent, or Firm* — Workman Nydegger

(57) ABSTRACT

Validating proof of possession (POP) of a private key by a device. A computer system generates a provisioning package for a device catalog. The provisioning package including a POP challenge. After generating the provisioning package, the computer system receives a device activation request for a device. The device activation request includes a public key, a device identifier, and a signature. The computer system validates POP of a private key corresponding to the public key, including using the public key, the device identifier, and the POP challenge to cryptographically verify the signature. The computer system establishes a trust relationship with the device, including registering the public key and the device identifier into the device catalog.

20 Claims, 4 Drawing Sheets

(56) References Cited

U.S. PATENT DOCUMENTS

| | | | |
|---|---|---|---|
| 2020/0313897 A1 | 10/2020 | Heath et al. | |
| 2022/0020003 A1* | 1/2022 | Sarkar | G06Q 20/38215 |
| 2022/0417241 A1* | 12/2022 | Zilbershtein | H04L 9/3247 |
| 2023/0188366 A1* | 6/2023 | Steinmetz | H04L 9/3247 |
| | | | 713/176 |
| 2023/0208643 A1* | 6/2023 | Watson | H04L 63/0407 |
| | | | 713/176 |
| 2024/0022432 A1* | 1/2024 | Spanier | H04L 9/3297 |
| 2024/0129139 A1* | 4/2024 | Dietrich | H04L 9/3271 |

OTHER PUBLICATIONS

"EdgeLock A5000 for Secure Connection to OEM Cloud", Retrieved from: https://www.nxp.com/docs/en/application-note/AN13501.pdf, Mar. 28, 2022, 14 Pages.

"International Search Report and Written Opinion Issued in PCT Application No. PCT/US23/022537", Mailed Date: Aug. 30, 2023, 13 Pages. (MS# 411815-WO-PCT).

Pritikin, Max, "Draft Standard for Local and Metropolitan Area Networks: Secure Device Identifier", In Proceedings of the P802.1AR/D0.8, vol. 802.1, Mar. 7, 2007, 60 Pages.

\* cited by examiner

PROOF OF POSSESSION OF PRIVATE KEYS FOR REMOTE DEVICES

BACKGROUND

Computer systems are coupled to one another, and to other electronic devices, to form both wired and wireless computer networks over which the computer systems and other electronic devices can transfer electronic data. Accordingly, the performance of many computing tasks is distributed across a number of different computer systems and/or a number of different computing environments. In some computing environments, one or more computing devices are provisioned by a centralized service. For example, in cloud computing environments, it is common for Internet of things (IoT) devices to be provisioned into a device catalog of a service operating at a server computer system. Once IoT devices are provisioned by a service, that service communicates, and potentially consumes, data that is generated by those IoT devices.

Provisioning an IoT device into a service's device catalog often involves the service obtaining and registering an identity parameter associated with the IoT device. This identity parameter may be used to subsequently validate the identity of the IoT device. As an example, asymmetric cryptography (also called public-key cryptography) uses a pair of related keys—a public encryption key (public key) and a private encryption key (private key)—to encrypt and decrypt data. In general, the public key of an asymmetric key pair can be shared freely, while the private key of the key pair is held as a secret key by the key pair's owner. A public key can be used by any person to encrypt a message, which can then only be decrypted by the corresponding private key. If a sender encrypts the message using their private key, the message can be decrypted only using that sender's public key, thus authenticating that the message originated from the sender. Thus, a service can use the public key of a registered IoT device as an identity parameter for that IoT device, and to validate that messages received from the IoT device were generated using a corresponding private key.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In some aspects, the techniques described herein relate to a method, implemented at a computer system that includes a processing system, for validating proof of possession (POP) of a private key by a device, the method including: generating a provisioning package that includes a POP challenge; receiving a device activation request for a device, the device activation request including a public key, a device identifier, and a signature; validating POP of a private key corresponding to the public key, including using the public key, the device identifier, and the POP challenge to cryptographically verify the signature; and establishing a trust relationship with the device, including registering the public key and the device identifier into a device catalog.

In some aspects, the techniques described herein relate to a computer system for validating POP of a private key by a device, including: a processing system; and a computer storage media that stores computer-executable instructions that are executable by the processing system to cause the computer system to at least: generate a provisioning package that includes a POP challenge; receive a device activation request for a device, the device activation request including a public key, a device identifier, and a signature; validate POP of a private key corresponding to the public key, including using the public key, the device identifier, and the POP challenge to cryptographically verify the signature; and establish a trust relationship with the device, including registering the public key and the device identifier into a device catalog.

In some aspects, the techniques described herein relate to a computer program product including a computer storage media that stores computer-executable instructions that are executable by a processing system to cause a computer system to validate POP of a private key by a device, the computer-executable instructions including instructions that are executable by the processing system to cause the computer system to at least: generate a provisioning package that includes a POP challenge; receive a device activation request for a device, the device activation request including a public key, a device identifier, and a signature; validate POP of a private key corresponding to the public key, including using the public key, the device identifier, and the POP challenge to cryptographically verify the signature; and establish a trust relationship with the device, including registering the public key and the device identifier into a device catalog.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the advantages and features of the systems and methods described herein can be obtained, a more particular description of the embodiments briefly described above will be rendered by reference to specific embodiments thereof which are illustrated in the appended drawings. Understanding that these drawings depict only typical embodiments of the systems and methods described herein, and are not therefore to be considered to be limiting of their scope, certain systems and methods will be described and explained with additional specificity and detail through the use of the accompanying drawings in which.

DETAILED DESCRIPTION

Challenges exist around developing a trust relationship with an identity parameter of a remote device, such as an IoT device, when provisioning that device into the service's device catalog. In particular, challenges exist around validating that an identity parameter, such as a public key, that is presented for a given device actually corresponds to a private key that is in possession of the party registering the device. This is because, when a service receives a public key as an identity parameter for a remote device that is to be provisioned into the service's device catalog, possession of that public key does not provide any proof that the party registering the device actually possesses the device itself (or its corresponding private key). Thus, it is possible that a party could obtain a public key for a device for which they do not have physical possession or control (e.g., another party's device), provision that device into a device catalog for a service they have access to or control, and then capture communications between the service and the device and/or control the device. Additionally, conventional device provisioning is error prone, as users might provision devices that will not be able to communicate later if there is a mismatch between the public key that is registered for a device during provisioning, and that device's actual public key.

Classically, these challenges have been dealt with by separately verifying the authenticity of a device's public key during provisioning, such as based on a query to a certification authority (CA). However, separately verifying the authenticity of a device's public key requires communications with a CA, and thus prevents remote devices from being provisioned to a service in an offline or asynchronous manner (e.g., in which the service and the remote devices do not directly communicate during the provisioning process). Additionally, separately verifying the authenticity of a device's public key requires communications with a CA requires establishing a trust relationship with that CA.

The embodiments described herein provide for POP of a private key by a remote device during provisioning of that remote device into a service's device catalog in a manner that does not require a separate public key verification mechanism—such as verification with a CA. These embodiments thus enforce that only those devices that prove the possession of their private key can be provisioned to a service's device catalog using their public key. Additionally, by not requiring a separate key verification mechanism, these embodiments enable a remote device to be reliably provisioned to a service in an offline or asynchronous manner.

Figure 1:
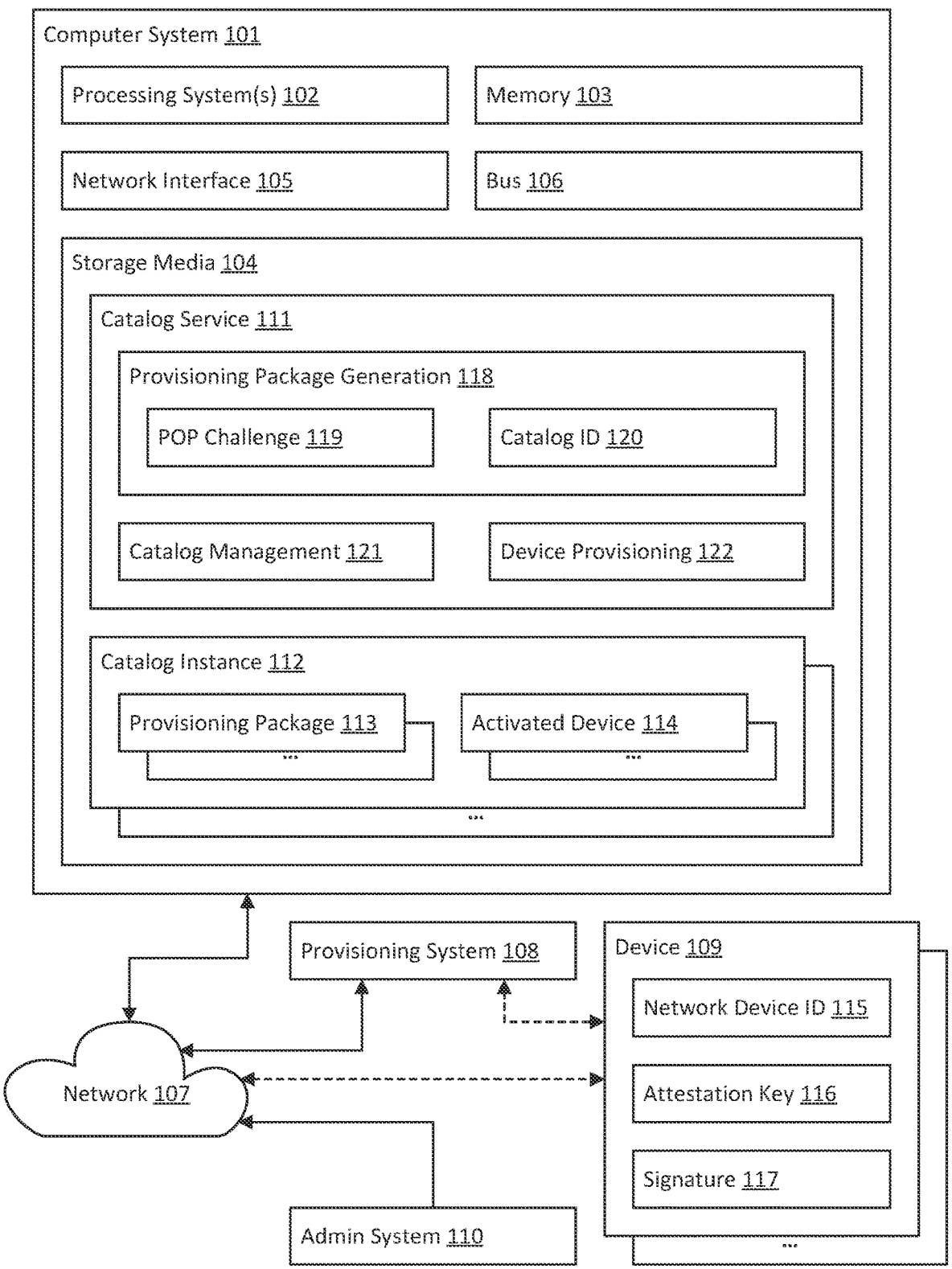
FIG. 1 illustrates an example computer architecture that facilitates validation of POP of private keys for remote devices.

FIG. 1 illustrates an example computer architecture 100 that facilitates validation of POP of private keys for remote devices. As shown, computer architecture 100 includes a computer system 101 comprising processing system(s) 102 (e.g., a single processor, or a plurality of processors), memory 103 (e.g., system or main memory), storage media 104 (e.g., a single computer-readable storage medium, or a plurality of computer-readable storage media), and a network interface 105 (e.g., one or more network interface cards), all interconnected by a bus 106. Additionally, the computer system 101 communicates over a network 107 with one or other computer systems, such as a provisioning system 108, a device 109 to be provisioned (or a plurality of devices to be provisioned), and/or an administrative (admin) system 110.

The storage media 104 is illustrated as storing computer-executable instructions implementing at least a catalog service 111, and as storing a catalog instance 112 (e.g., a device catalog for a service, such as a cloud service provided by computer system 101 or by some other computer system). In general, the catalog service 111 operates to provision a device 109 (e.g., an IoT device), including registering that device 109 into the catalog instance 112 as an activated device 114.

In embodiments, computer architecture 100 enables the device 109 to be provisioned by the catalog instance 112 in a direct manner, in which the catalog service 111 communicates directly with the device 109 via the network 107. In embodiments, computer architecture 100 additionally, or alternatively, enables the device 109 to be provisioned by the catalog instance 112 in an indirect (e.g., offline) manner, in which the catalog service 111 communicates directly with the provisioning system 108 via the network 107, and in which the provisioning system 108 then communicates with the device 109. In these latter embodiments, use of the provisioning system 108 enables the device 109 to be activated into the catalog instance 112 even in environments—such as factory floors, warehouses, secured locations, etc.—in which the device 109 lacks wide-area network (e.g., Internet) communications capabilities.

FIG. 1 illustrates an example of internal components of the catalog service 111 of FIG. 1. Each internal component of the catalog service 111 depicted in FIG. 1 represents various functionalities that the catalog service 111 might implement in accordance with various embodiments described herein. It will be appreciated, however, that the depicted components—including their identity and arrangement—are presented merely as an aid in describing example embodiments of the catalog service 111.

In FIG. 1, the catalog service 111 includes a catalog management component 121. In embodiments, the catalog management component 121 enables the catalog service 111 to create, delate, and manage a plurality of catalog instances. Thus, in FIG. 1, the storage media 104 is shown as storing a plurality of catalog instances, including catalog instance 112. In embodiments, the catalog management component 121 interacts with an admin system 110 (or a plurality of admin systems), to manage one or more catalog instances per customer, to manage one or more catalog instances per tenant, to manage one or more catalog instances per service, etc.

The catalog service 111 also includes a provisioning package generation component 118. In embodiments, the provisioning package generation component 118 generates one or more provisioning packages for each catalog instance, such as provisioning package 113 for catalog instance 112. As shown, the provisioning package generation component 118 includes a POP challenge component 119 that generates a POP challenge for each provisioning package, and a catalog identifier component 120 that inserts a catalog identifier (e.g., identifying catalog instance 112) into each provisioning package that is generated. Thus, in embodiments, provisioning packages include at least a POP challenge and a catalog identifier—though they can include additional information as well. In embodiments, each POP challenge is a unique value that is generated per provisioning package, such as a globally unique identifier (GUID) or a universally unique identifier (UUID).

The catalog service 111 also includes a device provisioning component 122. In embodiments, the device provisioning component 122 handles provisioning of devices, such as device 109, based on communications with those devices and/or based on communications with a separate provisioning service, such as provisioning system 108. In general, device provisioning involves communicating a provisioning package to a device, which then uses at least the POP challenge within the provisioning package to generate a signature that proves that the device possesses a private key used to sign the POP challenge.

Figure 2:
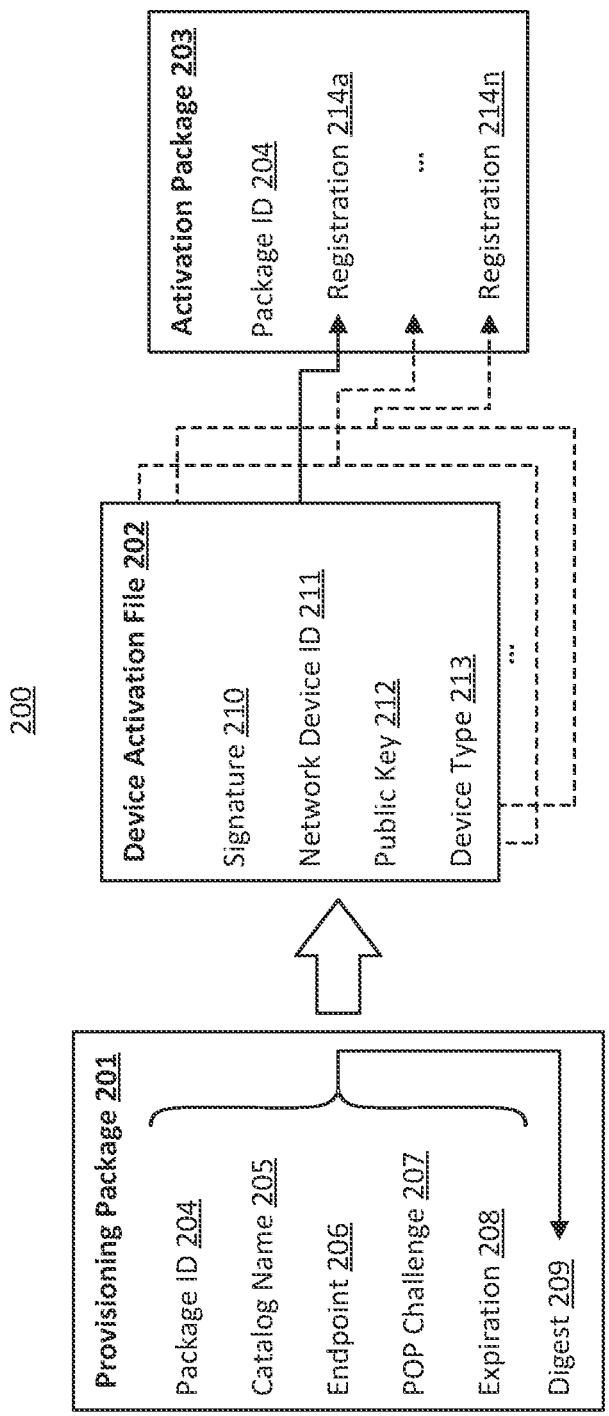
FIG. 2 illustrates an example process flow for generating device registration information that provides POP of a device private key.

To demonstrate this process, FIG. 2 illustrates an example process flow 200 for generating device registration information that provides POP of a device private key. Process flow 200 illustrates examples of a provisioning package 201

(e.g., generated by the provisioning package generation component 118), a device activation file 202 (e.g., generated by the device 109), and an activation package 203 (e.g., generated by the provisioning system 108). Notably, the various data fields illustrated in FIG. 2 are for illustrative purposes only, and it will be appreciated by one of ordinary skill in the art that some may be modified, or even omitted, without departing from the principles described herein.

The process flow 200 of FIG. 2 will be described in connection with FIG. 3, which illustrates an example timing diagram 300 for validating POP of private keys for remote devices. Timing diagram 300 includes an admin 301 (e.g., admin system 110), a catalog server 302 (e.g., computer system 101), a provisioner 303 (e.g., provisioning system 108), and a device 304 (e.g., device 109). Notably, while, for completeness, timing diagram 300 includes the admin 301 and the provisioner 303, it will be appreciated that embodiments consistent with the disclosure herein could operate with only the catalog server 302 and the device 304.

Figure 3:
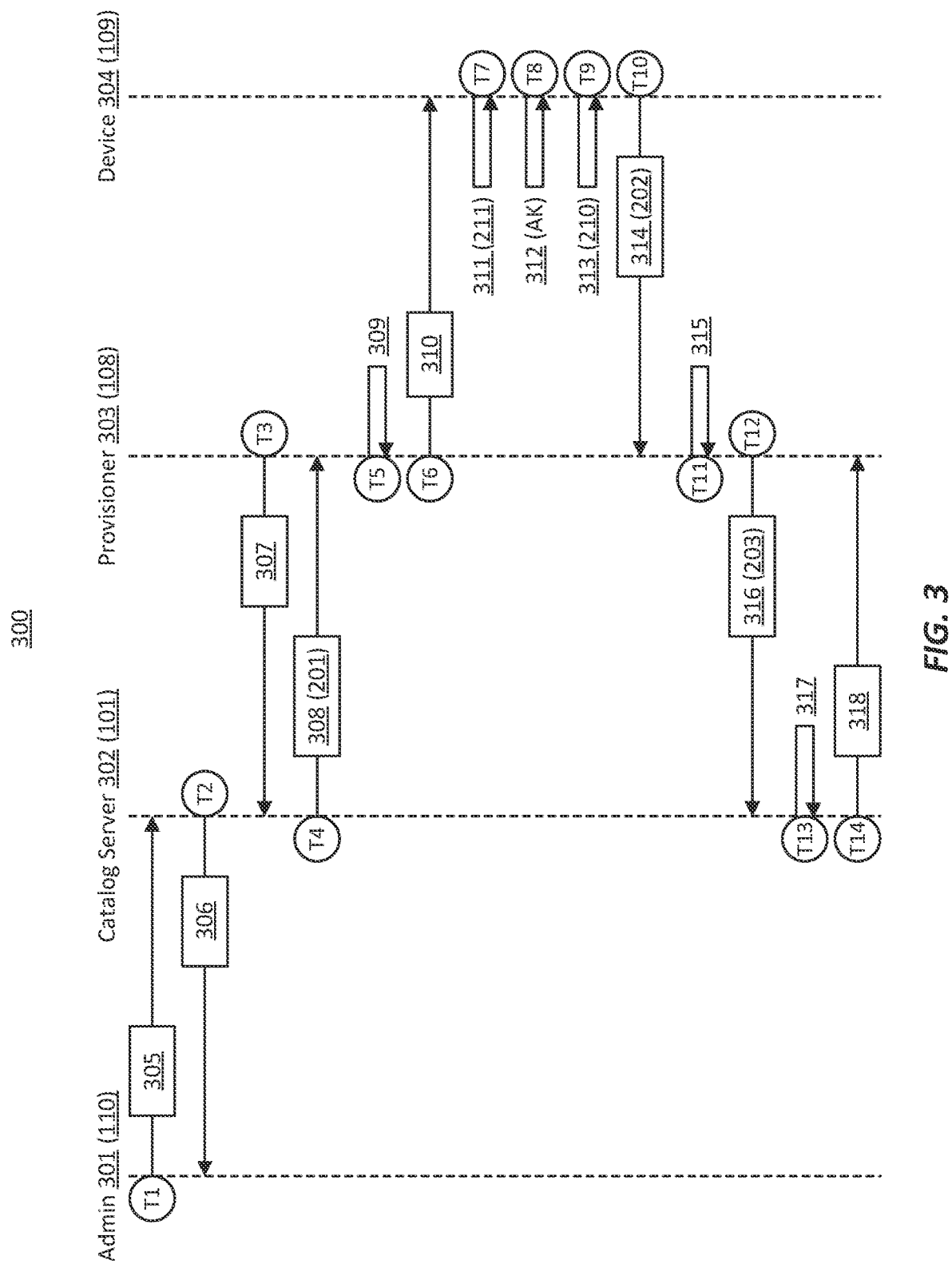
FIG. 3 illustrates an example timing diagram for validating POP of private keys for remote devices.

Referring to FIG. 3, at time T1 the admin 301 sends a message 305 to the catalog server 302, requesting creation of a provisioning package for an identified device catalog (e.g., catalog instance 112). In response, at time T2 the catalog server 302 returns a message 306 to the admin 301 acknowledging the request, and uses the provisioning package generation component 118 to create the requested provisioning package for the device catalog.

FIG. 2 shows that, in embodiments, the provisioning package 201 includes a package identifier (ID) 204, which is a unique identifier for the provisioning package 201. FIG. 2 also shows that, in embodiments, the provisioning package 201 also includes a catalog name 205, which identifies the device catalog (e.g., catalog instance 112) for which the provisioning package was created, and to which devices that consume the provisioning package 201 will be provisioned and activated. FIG. 2 also shows that, in embodiments, the provisioning package 201 also includes an endpoint 206, which specifies an endpoint universal resource identifier (URI) for services offered to devices activated using the provisioning package 201. FIG. 2 also shows that, in embodiments, the provisioning package 201 also includes a POP challenge 207, such as a random GUID value, which is used during device provisioning to validate the possession of a private key in the device being provisioned. FIG. 2 also shows that, in embodiments, the provisioning package 201 also includes an expiration 208, which specifies an expiration date of the provisioning package, and after which new devices cannot be activated using the provisioning package 201.

FIG. 2 also shows that, in at least some embodiments, the provisioning package 201 also includes a digest 209, such as a cryptographic hash (e.g., SHA1, SHA256, etc.), over one or more of the package ID 204, the catalog name 205, the endpoint 206, the POP challenge 207, and the expiration 208. In embodiments that include the digest 209, the digest 209 enables a receiving party to validate consistency of the data contained within the provisioning package 201. It will be appreciated by one of ordinary skill in the art, however, that the digest 209 could be omitted from the provisioning package 201.

In examples, the provisioning package is a JavaScript object notation (JSON) formatted file, though a wide variety of formats could be used. In examples, a provisioning package file contains two blocks—a "provisioning" block that includes specific provisioning and activation information, and a "hash" block defines a hashed value of the "provisioning" block.

Returning to FIG. 3, at time T3 the provisioner 303 sends a message 307 to the catalog server 302, requesting a provisioning package. In response, at time T4 the catalog server 302 sends a message 308 to the provisioner 303 with the requested provisioning package. As indicated, in an example, this message 308 can include the provisioning package 201 discussed in connection with FIG. 2. At time T5, step 309 represents the provisioner 303 distributing the provisioning package 201 to one or more devices, such as IoT devices on a factory floor, for provisioning of those devices.

At time T6, the provisioner 303 sends a message 310 to device 304, requesting that the device generate device activation information (e.g., device activation file 202) based on the provisioning package 201. FIG. 2 shows that, in embodiments, the device activation file 202 includes a network device ID 211 (e.g., network device ID 115 of device 109), which uniquely identifies the device 304 in the catalog instance 112. In some embodiments, the network device ID 211 is a combination of the catalog name 205 and a device hardware identifier (e.g., media access control (MAC) address, a unique firmware-based identifier). FIG. 2 also shows that, in embodiments, the device activation file 202 includes a public key 212 (e.g., attestation key (AK) 116 of device 109) associated with a private key possessed by the device 304. In embodiments, the public key 212 is a public AK, and the associated private key is a private AK. FIG. 2 also shows that, in embodiments, the device activation file 202 includes a device type 213, which identifies a type (e.g., model number) of the device being provisioned. FIG. 2 also shows that, in embodiments, the device activation file 202 includes a signature 210 (e.g., signature 117 of device 109), which includes a signature of the POP challenge 207. In embodiments, the content signed to generate the signature 210 follows a format of "Network Device ID+POP Challenge". In embodiments, the content signed also includes a prefix, which is a known constant value, such that the signature 210 follows a format of "Prefix+Network Device ID+POP Challenge".

Returning to FIG. 3, as a result of receiving message 310, the device 304 carries out a step 311 of generating a device identifier (e.g., network device ID 211) at time T7, a step 312 of generating an AK pair at time T8, and a step 313 of generating a signature (e.g., signature 210) at time T9. Notably, step 311 and step 312 could be reversed or performed in parallel. Additionally, in embodiments, step 312 may be optional, because the device 304 may already possess an AK pair. At time T10, the device 304 sends a message 314 to the provisioner 303 with device activation information. As indicated, in an example, this message 314 can include the device activation file 202 discussed in connection with FIG. 2.

At time T11, step 315 represents the provisioner 303 gathering device activation information from one or more devices, such as IoT devices on a factory floor. At time 112, the provisioner 303 sends a message 316 to catalog server 302, including device activation information for one or more devices (including device 304).

In some embodiments, this device activation information includes one or more device activation files, such as device activation file 202 (e.g., as a zip file of the different device activation files, plus the original provisioning package). In other embodiments, this device activation information is an activation package, which includes device activation information for one or more devices in a single file. FIG. 2 shows that, in embodiments, an activation package 203 includes the package ID 204 from the provisioning package 201, as well as one or more registrations (e.g., registration 214a to registration 214n). As shown, in embodiments, each registration comprises the information from a corresponding device activation file. Similar to the provisioning package 201, the device activation file 202 may include a digest that enables a receiving party to validate consistency of the data contained within the activation package 203.

Returning to FIG. 3, as a result of receiving message 316, at time 113, the catalog server 302 validates the device activation information obtained in the message 316 at step 317. Then, at time 114, the catalog server 302 sends a message 318 to the provisioner 303 acknowledging and/or confirming the provisioning of the device(s) identified in message 316.

In embodiments, at step 317, the device provisioning component 122 uses the public key (e.g., public key 212) and the network device ID (e.g., network device ID 211) received as part of the device activation information (device activation file 202) for each device to validate the signature (e.g., signature 210) generated by that device. If that signature validates, then the device provisioning component 122 registers that device as an activated device 114.

Notably, in timing diagram 300, the catalog server 302 could have communicated directly with device 304, eliminating the provisioner 303. However, including the provisioner 303 makes the process asynchronous, enabling the device 304 to be provisioned even if it is offline (e.g., unable to communicate with the catalog server 302).

Figure 4:
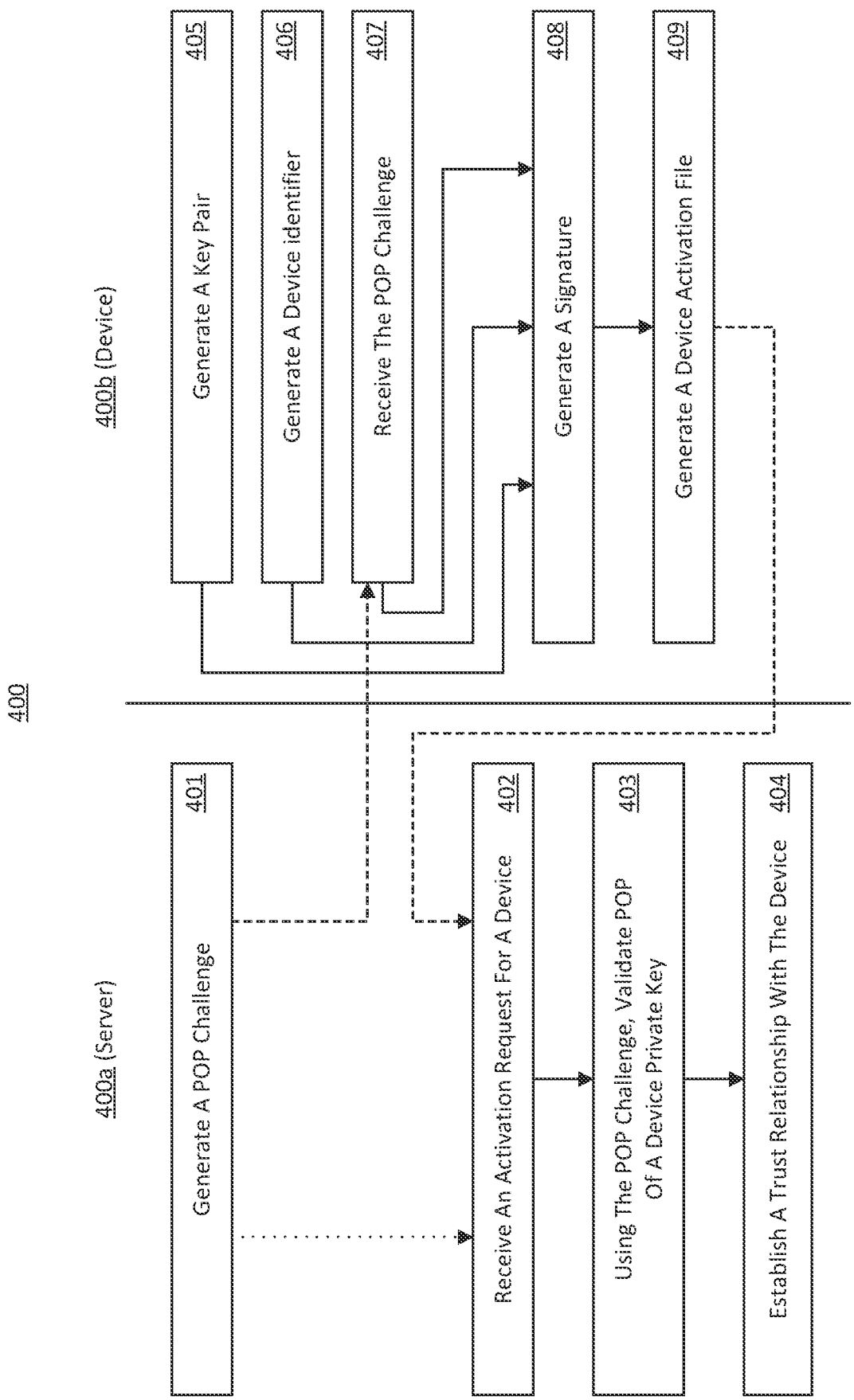
FIG. 4 illustrates a flow chart of an example method for validating POP of a private key by a device.

Embodiments are now described in connection with FIG. 4, which illustrates a flow chart of an example 400 of a method for validating POP of a private key by a device. As shown, example 400 includes a method 400a (e.g., act 401 to act 404) performed at a server (e.g., computer system 101), and a method 400b (e.g., act 405 to act 409) performed at a device (e.g., device 109). In some embodiments, method 400a and method 400b are independent methods. In other embodiments, method 400a and method 400b are each part of a single method.

In embodiments, instructions for implementing methods 400a and 400b are encoded as computer-executable instructions (e.g., catalog service 111) stored on a computer storage media that are executable by a processing system to cause a computer system (e.g., computer system 101, device 109) to perform the method. The following discussion now refers to a number of methods and method acts. Although the method acts may be discussed in certain orders, or may be illustrated in a flow chart as occurring in a particular order, no particular ordering is required unless specifically stated, or required because an act is dependent on another act being completed prior to the act being performed.

Referring first to the catalog service 111, method 400a comprises an act 401 of generating a POP challenge. In some embodiments, act 401 comprises generating a provisioning package that includes a POP challenge. In an example, the provisioning package generation component 118 generates provisioning package 201, including using the POP challenge component 119 to generate POP challenge 207. By generating POP challenge 207, act 401 has an effect of generating information that is usable by a remote device to prove that it possesses a private key corresponding a public key being used to identify the remote device.

In some embodiments of method 400a, the provisioning package also includes a catalog identifier. In an example, the provisioning package generation component 118 uses the catalog identifier component 120 to insert the catalog name 205 (e.g., of catalog instance 112) into the provisioning package 201. In an example, the provisioning package generation component 118 generates and inserts package ID 204 into the provisioning package 201.

In some embodiments, the catalog service 111 sends this provisioning package (including the POP challenge generated in act 401) to a provisioning system, such as provisioning system 108. Thus, in some embodiments, method 400a further comprises sending the provisioning package to a provisioning system. In other embodiments, the catalog service 111 sends this provisioning package (including the POP challenge generated in act 401) to a device to be provisioned, such as device 109. Thus, in some embodiments, method 400a further comprises sending the provisioning package to a remote device to be provisioned.

Method 400a also comprises an act 402 of receiving an activation request for a device. In some embodiments, act 402 comprises, after generating the provisioning package, receiving a device activation request for a device, the device activation request including a public key, a device identifier, and a signature. In an example, the device provisioning component 122 receives the information shown in device activation file 202 as part of a device activation request.

In some embodiments, such as when the catalog service 111 sent a provisioning package to a provisioning system, method 400a includes receiving an activation package (e.g., activation package 203) from the provisioning system. In embodiments, this activation package includes a plurality of device activation requests for a plurality of devices (e.g., registration 214a to registration 214n), and these the device activation request include the device activation request for the device (e.g., registration 214a). In other embodiments, such as when the catalog service 111 sent a provisioning package to a device to be provisioned, method 400a includes receiving the device activation request (e.g., device activation file 202) from the device directly.

Method 400a also comprises an act 403 of, using the POP challenge, validating POP of a device private key. In some embodiments, act 403 comprises validating POP of a private key corresponding to the public key, including using at least the public key and the POP challenge to cryptographically verify the signature. In an example, the device provisioning component 122 verifies that the signature 210 received in the device activation request (e.g., device activation file 202) is (1) encrypted by a private key corresponding to the public key 212 received in the device activation (e.g., by obtaining a first digest based on using the public key to decrypt the signature), and (2) was generated based on the POP challenge 207 generated in act 401 (e.g., by calculating a second digest at least the POP challenge, and determining that the first digest and the second digest are equal). In some embodiments, act 403 comprises also using the device identifier to cryptographically verify the signature. For example, the device provisioning component 122 verifies that the signature 210 received in the device activation request was generated based on a combination of at least the device identifier and the POP challenge.

As mentioned, in some embodiments, the provisioning package also includes a catalog identifier (e.g., catalog name 205). In these embodiments, the device identifier (e.g., network device ID 211) comprises a combination of at least the catalog identifier and a device-specific identifier (e.g., a device hardware identifier, such as a MAC address or a unique firmware-based identifier).

Method 400a also comprises an act 404 of establishing a trust relationship with the device. In some embodiments, act 404 comprises establishing a trust relationship with the device, including registering at least the public key and the device identifier into the device catalog. In an example, based on validating POP of the device private key in act 403, the device provisioning component 122 establishes a trust relationship with device 109 by registering it as an activated device 114 within catalog instance 112. In one example, the device provisioning component 122 stores the device activation file 202, or a portion thereof, into the catalog instance 112.

As shown in FIG. 2, in embodiments the activation package 203 includes a package ID 204, which is a unique identifier for the provisioning package 201. In these embodiments, the device provisioning component 122 associates the network device ID 211 with the package ID 204 within the catalog instance 112. Thus, in embodiments, the provisioning package also includes a provisioning package identifier, and registering the public key and the device identifier into the device catalog includes associating the device identifier with the provisioning package identifier. Notably, this association enables a catalog maintainer to manage all devices registered under a particular package ID 204 as a group, such as to revoke all devices if a provisioning system to which that package ID 204 was sent is found to have been compromised or be malicious.

Referring now to the device 109, method 400b comprises an act 405 of generating a key pair. In some embodiments, act 405 comprises generating an asymmetric key pair, including a public key and a private key. In embodiments, the asymmetric key pair is an AK pair, including a public AK and a private AK.

Method 400b also comprises an act 406 of generating a device identifier. In some embodiments, act 406 comprises, based at least on receiving the provisioning package, generating the device identifier by combining at least a catalog identifier and a device-specific identifier. In an example, the device 109 receives provisioning package 201, either directly from the computer system 101 or via the provisioning system 108. Then, the device 109 uses the catalog name 205, together with a device-specific identifier (e.g., a device hardware identifier, such as a MAC address or a unique firmware-based identifier) to generate the network device ID 211.

Method 400b also comprises an act 407 of receiving the POP challenge. In an example, the device 109 receives provisioning package 201, including POP challenge 207, either directly from the computer system 101 or via the provisioning system 108.

Notably, no particular ordering is illustrated between act 405, act 406, and act 407. Thus, in various embodiments, these acts are performed in different orders, or in parallel.

Method 400b also comprises an act 408 of generating a signature. In some embodiments, act 408 comprises, based at least on receiving the provisioning package, generating the signature using the private key. In an example, the device creates a message using at least the POP challenge 207 received in act 407, generates a digest over that message, and encrypts the digest using the device's private key (e.g., generated in act 405) to create the signature. Thus, in embodiments, act 408 comprises, based at least on receiving the provisioning package, the generating the signature by generating the first digest over at least the POP challenge, and encrypting the first digest using the private key. This has an effect of proving, to a party (e.g., computer system 101) that receives that message and that is in possession the POP challenge 207, that the device 109 possesses the private key used to generate the signature.

In some embodiments, when creating the message, the device 109 also uses at least the network device ID 211 generated in act 406. Thus, in embodiments, act 408 comprises, based at least on receiving the provisioning package, the generating the signature by generating the first digest over a combination of at least the POP challenge and the device identifier, and encrypting the first digest using the private key. Since the device identifier is based on a catalog identifier, this has an additional effect of tying the device's activation to a particular catalog, such as catalog instance 112.

Method 400b also comprises an act 409 of generating a device activation file. In an example, the device 109 generates device activation file 202 and sends that file to provisioning system 108 (which uses that file to generate activation package 203), or to the computer system 101 directly.

Embodiments of the disclosure may comprise or utilize a special-purpose or general-purpose computer system (e.g., computer system 101) that includes computer hardware, such as, for example, one or more processors (e.g., processing system 102) and system memory (e.g., memory 103), as discussed in greater detail below. Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions and/or data structures are computer storage media (e.g., storage media 104). Computer-readable media that carry computer-executable instructions and/or data structures are transmission media. Thus, by way of example, embodiments of the disclosure can comprise at least two distinctly different kinds of computer-readable media: computer storage media and transmission media.

Computer storage media are physical storage media that store computer-executable instructions and/or data structures. Physical storage media include computer hardware, such as random access memory (RAM), read-only memory (ROM), electrically erasable programmable ROM (EEPROM), solid state drives (SSDs), flash memory, phase-change memory (PCM), optical disk storage, magnetic disk storage or other magnetic storage devices, or any other hardware storage device(s) which can be used to store program code in the form of computer-executable instructions or data structures, which can be accessed and executed by a general-purpose or special-purpose computer system to implement the disclosed functionality.

Transmission media can include a network and/or data links which can be used to carry program code in the form of computer-executable instructions or data structures, and which can be accessed by a general-purpose or special-purpose computer system. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as transmission media. Combinations of the above should also be included within the scope of computer-readable media.

Further, upon reaching various computer system components, program code in the form of computer-executable instructions or data structures can be transferred automatically from transmission media to computer storage media (or vice versa). For example, computer-executable instructions or data structures received over a network or data link can be buffered in RAM within a network interface module (e.g., network interface 105), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at one or more processors (processing systems), cause a general-purpose computer system, special-purpose computer system, or special-purpose processing device to perform a certain function or group of functions. Computer-executable instructions may be, for example, binaries, intermediate format instructions such as assembly language, or even source code.

It will be appreciated that the disclosed systems and methods may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. Embodiments of the disclosure may also be practiced in distributed system environments where local and remote computer systems, which are linked (either by hardwired data links, wireless data links, or by a combination of hardwired and wireless data links) through a network, both perform tasks. As such, in a distributed system environment, a computer system may include a plurality of constituent computer systems. In a distributed system environment, program modules may be located in both local and remote memory storage devices.

It will also be appreciated that the embodiments of the disclosure may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). A cloud computing model can be composed of various characteristics, such as on-demand self-service, broad network access, resource pooling, rapid elasticity, measured service, and so forth. A cloud computing model may also come in the form of various service models such as, for example, Software as a Service (SaaS), Platform as a Service (PaaS), and Infrastructure as a Service (IaaS). The cloud computing model may also be deployed using different deployment models such as private cloud, community cloud, public cloud, hybrid cloud, and so forth.

Some embodiments, such as a cloud computing environment, may comprise a system that includes one or more hosts that are each capable of running one or more virtual machines. During operation, virtual machines emulate an operational computing system, supporting an operating system and perhaps one or more other applications as well. In some embodiments, each host includes a hypervisor that emulates virtual resources for the virtual machines using physical resources that are abstracted from view of the virtual machines. The hypervisor also provides proper isolation between the virtual machines. Thus, from the perspective of any given virtual machine, the hypervisor provides the illusion that the virtual machine is interfacing with a physical resource, even though the virtual machine only interfaces with the appearance (e.g., a virtual resource) of a physical resource. Examples of physical resources including processing capacity, memory, disk space, network bandwidth, media drives, and so forth.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present disclosure may be embodied in other specific forms without departing from its essential characteristics. The described embodiments are to be considered in all respects only as illustrative and not restrictive. All changes which come within the meaning and range of equivalency of the claims are to be embraced within their scope.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set, "superset" is defined as a non-empty superset, and "subset" is defined as a non-empty subset. Unless otherwise specified, the term "subset" excludes the entirety of its superset (i.e., the superset contains at least one item not included in the subset). Unless otherwise specified, a "superset" can include at least one additional element, and a "subset" can exclude at least one element.

What is claimed:

1. A method, implemented at a computer system that includes a processing system, for validating proof of possession (POP) of a private key by a device, the method comprising:
    generating a provisioning package that includes a POP challenge;
    receiving a device activation request for a device, the device activation request including a public key, a device identifier, and a signature;
    validating POP of a private key corresponding to the public key, including using the public key, the device identifier, and the POP challenge to cryptographically verify the signature; and
    establishing a trust relationship with the device, including registering the public key and the device identifier into a device catalog.

2. The method of claim 1, wherein the provisioning package also includes a catalog identifier, and wherein the device identifier comprises a combination of at least the catalog identifier and a device-specific identifier.

3. The method of claim 1, wherein the provisioning package also includes a provisioning package identifier, and wherein registering the public key and the device identifier into the device catalog includes associating the device identifier with the provisioning package identifier.

4. The method of claim 1, wherein, based at least on receiving the provisioning package, the device generates the device identifier by combining at least a catalog identifier and a device-specific identifier.

5. The method of claim 1, wherein, based at least on receiving the provisioning package, the device generates the signature using the private key.

6. The method of claim 1, wherein using the public key, the device identifier, and the POP challenge to cryptographically verify the signature includes:
   obtaining a first digest by using the public key to decrypt the signature;
   calculating a second digest over a combination of at least the POP challenge and the device identifier; and
   determining that the first digest and the second digest are equal.

7. The method of claim 6, wherein, based at least on receiving the provisioning package, the device generates the signature by:
   generating the first digest over the combination of at least the POP challenge and the device identifier; and
   encrypting the first digest using the private key.

8. The method of claim 1, further comprising:
   sending the provisioning package to a provisioning system; and
   receiving an activation package from the provisioning system, the activation package including a plurality of device activation requests for a plurality of devices, the plurality of device activation requests including the device activation request for the device.

9. The method of claim 1, further comprising:
   sending the provisioning package to the device; and
   receiving the device activation request from the device.

10. A computer system for validating proof of possession (POP) of a private key by a device, comprising:
    a processing system; and
    a computer storage media that stores computer-executable instructions that are executable by the processing system to cause the computer system to at least:
      generate a provisioning package that includes a POP challenge;
      receive a device activation request for a device, the device activation request including a public key, a device identifier, and a signature;
      validate POP of a private key corresponding to the public key, including using the public key, the device identifier, and the POP challenge to cryptographically verify the signature; and
      establish a trust relationship with the device, including registering the public key and the device identifier into a device catalog.

11. The computer system of claim 10, wherein the provisioning package also includes a catalog identifier, and wherein the device identifier comprises a combination of at least the catalog identifier and a device-specific identifier.

12. The computer system of claim 10, wherein the provisioning package also includes a provisioning package identifier, and wherein registering the public key and the device identifier into the device catalog includes associating the device identifier with the provisioning package identifier.

13. The computer system of claim 10, wherein, based at least on receiving the provisioning package, the device generates the device identifier by combining at least a catalog identifier and a device-specific identifier.

14. The computer system of claim 10, wherein, based at least on receiving the provisioning package, the device generates the signature using the private key.

15. The computer system of claim 10, wherein using the public key, the device identifier, and the POP challenge to cryptographically verify the signature includes:
    obtaining a first digest by using the public key to decrypt the signature;
    calculating a second digest over a combination of at least the POP challenge and the device identifier; and
    determining that the first digest and the second digest are equal.

16. The computer system of claim 15, wherein, based at least on receiving the provisioning package, the device generates the signature by:
    generating the first digest over the combination of at least the POP challenge and the device identifier; and
    encrypting the first digest using the private key.

17. The computer system of claim 10, the computer-executable instructions also including instructions that are executable by the processing system to cause the computer system to:
    send the provisioning package to a provisioning system; and
    receive an activation package from the provisioning system, the activation package including a plurality of device activation requests for a plurality of devices, the plurality of device activation requests including the device activation request for the device.

18. The computer system of claim 10, the computer-executable instructions also including instructions that are executable by the processing system to cause the computer system to:
    send the provisioning package to the device; and
    receive the device activation request from the device.

19. A computer program product comprising a computer storage device that stores computer-executable instructions that are executable by a processing system to cause a computer system to validate proof of possession (POP) of a private key by a device, the computer-executable instructions including instructions that are executable by the processing system to cause the computer system to at least:
    generate a provisioning package that includes a POP challenge;
    after generating the provisioning package, receive a device activation request for a device, the device activation request including a public key, a device identifier, and a signature;
    validate POP of a private key corresponding to the public key, including using the public key, the device identifier, and the POP challenge to cryptographically verify the signature; and
    establish a trust relationship with the device, including registering the public key and the device identifier into a device catalog.

20. The computer program product of claim 19, wherein the provisioning package also includes a catalog identifier, and wherein the device identifier comprises a combination of at least the catalog identifier and a device-specific identifier.

* * * * *